United States Patent
Sarma et al.

(10) Patent No.: US 10,472,285 B2
(45) Date of Patent: Nov. 12, 2019

(54) COMPOSITE CERAMIC MATERIALS, ARTICLES, AND METHOD OF MANUFACTURE

(71) Applicant: Corning Incorporated, Corning, NY (US)

(72) Inventors: Huthavahana Kuchibhotla Sarma, Painted Post, NY (US); Elizabeth Marie Vileno, Corning, NY (US); Bryan Ray Wheaton, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/808,622

(22) Filed: Nov. 9, 2017

(65) Prior Publication Data

US 2018/0127316 A1    May 10, 2018

Related U.S. Application Data

(60) Provisional application No. 62/420,403, filed on Nov. 10, 2016.

(51) Int. Cl.
*C04B 35/46* (2006.01)
*C04B 35/478* (2006.01)
(Continued)

(52) U.S. Cl.
CPC ........ *C04B 35/478* (2013.01); *B01D 39/2068* (2013.01); *B01D 46/24* (2013.01);
(Continued)

(58) Field of Classification Search
CPC .................... C04B 35/185; C04B 2235/3463
See application file for complete search history.

(56) References Cited

U.S. PATENT DOCUMENTS

| | | |
|---|---|---|
| 4,483,944 A | 11/1984 | Day et al. |
| 4,855,265 A | 8/1989 | Day et al. |

(Continued)

FOREIGN PATENT DOCUMENTS

| | | |
|---|---|---|
| WO | 2009076985 A1 | 6/2009 |
| WO | 2010033763 A1 | 3/2010 |

(Continued)

OTHER PUBLICATIONS

Ibrahim et al. Cordierite-Mullite Refractories. Ceramics International 21 (1995) 265-269.*

(Continued)

*Primary Examiner* — Noah S Wiese
(74) *Attorney, Agent, or Firm* — Joseph M. Homa (57) ABSTRACT

Composite ceramic materials are disclosed herein which comprise two or more crystalline phases, wherein a first crystalline phase comprises a first refractory material having a first melting point, and a second crystalline phase comprises a second refractory material having a second melting point which is lower than the first melting point, and the second crystalline phase comprises large domain sizes of the second refractory material. Articles comprising such a composite ceramic material, such as honeycomb bodies, catalytic substrates, and particulate filters, are also disclosed herein, in addition to methods of manufacture thereof.

38 Claims, 3 Drawing Sheets

(51) Int. Cl.
    *B01D 39/20*    (2006.01)
    *B01J 21/04*    (2006.01)
    *B01J 21/06*    (2006.01)
    *B01J 37/00*    (2006.01)
    *B01J 37/08*    (2006.01)
    *C04B 35/10*    (2006.01)
    *C04B 35/64*    (2006.01)
    *B01D 46/24*    (2006.01)
    *C04B 35/185*   (2006.01)
    *C04B 35/195*   (2006.01)
    *C04B 35/465*   (2006.01)
    *C04B 35/626*   (2006.01)
    *C01G 23/00*    (2006.01)

(52) U.S. Cl.
    CPC ............ *B01J 21/04* (2013.01); *B01J 21/063* (2013.01); *B01J 37/0009* (2013.01); *B01J 37/08* (2013.01); *C04B 35/10* (2013.01); *C04B 35/185* (2013.01); *C04B 35/195* (2013.01); *C04B 35/46* (2013.01); *C04B 35/465* (2013.01); *C04B 35/6263* (2013.01); *C04B 35/62665* (2013.01); *C04B 35/62675* (2013.01); *C04B 35/64* (2013.01); *B01D 2239/1208* (2013.01); *B01D 2239/1216* (2013.01); *C01G 23/006* (2013.01); *C04B 2235/3206* (2013.01); *C04B 2235/327* (2013.01); *C04B 2235/3217* (2013.01); *C04B 2235/3222* (2013.01); *C04B 2235/3224* (2013.01); *C04B 2235/3229* (2013.01); *C04B 2235/3232* (2013.01); *C04B 2235/3236* (2013.01); *C04B 2235/3418* (2013.01); *C04B 2235/3445* (2013.01); *C04B 2235/3463* (2013.01); *C04B 2235/3481* (2013.01); *C04B 2235/606* (2013.01); *C04B 2235/6021* (2013.01); *C04B 2235/656* (2013.01); *C04B 2235/6562* (2013.01); *C04B 2235/6565* (2013.01); *C04B 2235/76* (2013.01); *C04B 2235/77* (2013.01); *C04B 2235/78* (2013.01); *C04B 2235/80* (2013.01)

(56) References Cited

U.S. PATENT DOCUMENTS

| | | |
|---|---|---|
| 4,960,738 A | 10/1990 | Hori et al. |
| 5,290,739 A | 3/1994 | Hickman |
| 5,346,870 A | 9/1994 | Noguchi et al. |
| 6,555,031 B2 | 4/2003 | Gadkaree et al. |
| 6,620,751 B1 | 9/2003 | Ogunwumi |
| 6,699,429 B2 | 3/2004 | Lu et al. |
| 6,849,181 B2 | 2/2005 | Ogunwumi et al. |
| 6,942,713 B2 | 9/2005 | Ogunwumi et al. |
| 7,001,861 B2 | 2/2006 | Beall et al. |
| 7,294,164 B2* | 11/2007 | Merkel ............... B01D 46/2429 264/42 |
| 8,956,436 B2 | 2/2015 | Divens-Dutcher et al. |
| 8,999,872 B2* | 4/2015 | Grohol ................. C04B 35/185 501/135 |
| 9,079,799 B2 | 7/2015 | Divensl-Dutcher et al. |
| 9,452,578 B2 | 9/2016 | Bronfenbrenner et al. |
| 2010/0300053 A1* | 12/2010 | Alary ................... C04B 35/185 55/523 |
| 2014/0150389 A1 | 6/2014 | Divens-Dutcher et al. |
| 2015/0225299 A1* | 8/2015 | Alary ................... C04B 35/185 55/523 |
| 2016/0068441 A1 | 3/2016 | Backhaus-Ricoult et al. |

FOREIGN PATENT DOCUMENTS

| | | |
|---|---|---|
| WO | 2012135401 A1 | 10/2012 |
| WO | 2015042499 A2 | 3/2015 |

OTHER PUBLICATIONS

Beecher et al. Thermal Properties of Mullite-Cordierite Composites. Thermal Conductivity 20, 1989. pp. 119-127.*
International Search Report and Written Opinion PCT/US2017/060797 dated Feb. 16, 2018.

* cited by examiner

COMPOSITE CERAMIC MATERIALS, ARTICLES, AND METHOD OF MANUFACTURE

This application claims the benefit of priority under 35 U.S.C. § 119 of U.S. Provisional Application Ser. No. 62/420,403, filed on Nov. 10, 2016, the content of which is relied upon and incorporated herein by reference in its entirety.

BACKGROUND

Field

The present specification generally relates to the composite ceramic materials and articles, and their manufacture, and, more particularly, to composite ceramic materials and articles having a large domain ceramic phase.

Technical Background

Ceramic articles constituted of refractory ceramic materials such as cordierite, silicon carbide, aluminum titanate and the like can be used for the manufacture of catalytic substrates and particulate filters.

SUMMARY

Composite ceramic materials are disclosed herein which comprise two or more crystalline phases, wherein a first crystalline phase comprises a first refractory material having a first melting point, and a second crystalline phase comprises a second refractory material having a second melting point which is lower than the first melting point, and the second crystalline phase comprises large domain sizes of the second refractory material. Articles comprising such a composite ceramic material, such as honeycomb bodies, catalytic substrates, and particulate filters, are also disclosed herein, in addition to methods of manufacture thereof.

In a first aspect, a ceramic material is disclosed herein comprising: a first crystalline phase comprised of a first refractory material, the first crystalline phase having a first melting point; and a second crystalline phase comprised of a second refractory material having a second melting point which is lower than the first melting point, wherein the second crystalline phase comprises domain sizes of greater than 5,000 $\mu m^2$ as measured by Electron Backscattered Diffraction (EBSD). Domain size refers to continuous or semi-continuous regions of cordierite grains whose crystallographic orientations are closely related. Crystals within a domain have approximately the same orientation, while neighboring domains have a significantly different orientation, more than 20 degrees of mis-orientation. Crystal orientation of the cordierite grains are determined by Electron Backscattered Diffraction (EBSD) while domains are determined from the EBSD maps through image analysis of grains with similar c-axis orientation. In some embodiments, the first crystalline phase constitutes at least 50% by volume of the material. In some embodiments, the second crystalline phase constitutes less than 50% by volume of the material. In some embodiments, the first crystalline phase constitutes at least 50% by volume of the material, and the second crystalline phase constitutes less than 50% by volume of the material. In some embodiments, the first crystalline phase constitutes at least 50% by weight of the material. In some embodiments, the second crystalline phase constitutes less than 35% by weight of the material. In some embodiments, the first crystalline phase constitutes at least 55% by weight of the material, and the second crystalline phase constitutes less than 35% by weight of the material. In some embodiments, the first crystalline phase constitutes at least 60% by weight of the material, and the second crystalline phase constitutes less than 30% by weight of the material. In some embodiments, the melting point of the first crystalline phase is greater than 1500° C. In some embodiments, the melting point of the second crystalline phase is less than 1500° C. In some embodiments, the melting point of the second crystalline phase is 1450° C. or less; in some of these embodiments, the melting point of the second crystalline phase is 1300° C. to 1450° C.; in some of these embodiments, the melting point of the second crystalline phase is 1425° C. to 1450° C. In some embodiments, the melting point of the first crystalline phase is greater than 1500° C. and the melting point of the second crystalline phase is less than 1500° C.

In a second aspect, a ceramic material is disclosed herein comprising: a first crystalline phase comprised of a first refractory material, the first crystalline phase having a first melting point; and a second crystalline phase comprised of a second refractory material having a second melting point which is lower than the first melting point, wherein the second crystalline phase has an average domain size of greater than 2,500 $\mu m^2$ as measured by Electron Backscattered Diffraction (EBSD). In some embodiments, the second crystalline phase has an average domain size of greater than 3,000 $\mu m^2$ as measured by Electron Backscattered Diffraction (EBSD), in some embodiments greater than 5,000 $\mu m^2$, in some embodiments greater than 10,000 $\mu m^2$, in some embodiments greater than 15,000 $\mu m^2$, and in some embodiments greater than 20,000 $\mu m^2$.

In a third aspect, a ceramic material is disclosed herein comprising: a first crystalline phase comprised of a first refractory material, the first crystalline phase having a first melting point; and a second crystalline phase comprised of a second refractory material having a second melting point which is lower than the first melting point, wherein the second crystalline phase comprises domain sizes of greater than 4,000 $\mu m^2$ an average domain size of greater than 2,500 $\mu m^2$ as measured by Electron Backscattered Diffraction (EBSD). In some embodiments, the first crystalline phase comprises tialite. In some embodiments, the first crystalline phase further comprises $MgTi2O5$. In some embodiments, the second crystalline phase comprises cordierite. In some embodiments, the ceramic material further comprises a third crystalline phase comprising mullite.

In a fourth aspect, a composite ceramic material is disclosed herein comprising: a first crystalline phase comprised of tialite, the first crystalline phase having a first melting point and a first maximum domain size in a select cross-sectional plane; and a second crystalline phase comprised of cordierite having a second melting point which is lower than the first melting point, and having a second maximum domain size in the select cross-sectional plane, wherein a ratio of the second maximum domain size to the first maximum domain size is 6.0 or more. In some embodiments, the ratio of the second maximum domain size to the first maximum domain size is 7.0 or more, in some embodiments 8.0 or more, in some embodiments 10.0 or more, in some embodiments 15 or more, and in some embodiments 20 or more.

In a fifth aspect, a method of manufacturing an article comprised of composite ceramic material is disclosed herein, the method comprising: heating a body comprised of an initial mixture comprising a first refractory material or its precursors, or both, and a second refractory material or its precursors, or both, which if first refractory material precursors are present the heating is sufficient to cause reactive formation of first refractory material from at least some of its precursors, and which if second refractory material precursors are present is sufficient to cause reactive formation of second refractory material from at least some of its precursors, and the heating is sufficient to cause at least some of the first refractory material to melt and to contact at least some of the second refractory material without causing the second refractory material to melt during the heating, and then cooling the body such that a composite ceramic material is formed, the composite ceramic material comprising a first crystalline phase comprised of the first refractory material, and a second crystalline phase comprised of the second refractory material, wherein the second crystalline phase comprises domain sizes of greater than 5,000 µm$^2$ as measured by Electron Backscattered Diffraction (EBSD).

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments of methods and apparatuses for forming ceramic articles and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to various embodiments of methods for producing ceramic articles including extracting at least some organic materials prior to firing, examples of which are illustrated in the accompanying drawings. Whenever possible, the same reference numerals will be used throughout the drawings to refer to the same or like parts.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

As used herein, a "wt %," "weight percent," or "percent by weight" of an inorganic or organic component of a batch mixture, unless specifically stated to the contrary, is based on the total weight of the inorganics in which the component is included. Organic components are specified herein as super additions based upon 100% of the inorganic components used.

Specific and preferred values disclosed for components, ingredients, additives, reactants, constants, scaling factors, and like aspects, and ranges thereof, are for illustration only. They do not exclude other defined values or other values within defined ranges. The compositions, apparatus, and methods of the disclosure include those having any value or combination of the values, specific values, or ranges thereof described herein. Any ranges of values set forth in this specification contemplate all values within the range and are to be construed as support for claims reciting any sub-ranges having endpoints which are real number values within the specified range in question.

Ceramic-forming raw materials comprise inorganic materials. As an example, the ceramic-forming raw materials may be cordierite-forming raw materials, aluminum titanate-forming raw materials, silicon carbide-forming raw materials, alumina-forming raw materials, alumina, silica, magnesia, titania, aluminum-containing ingredients, silicon-containing ingredients, titanium-containing ingredients, and the like. As used herein, tialite is aluminum titanate (Al2TiO5), or a solid solution of aluminum titanate (Al2TiO5) and magnesium titanate (MgTi2O5).

Cordierite-forming raw materials may include, for example, at least one magnesium source, at least one alumina source, and at least one silica source. The cordierite-forming raw materials may further include one or more of clay and titania, as well as alkaline earth metals and oxides.

In the embodiments described herein, sources of magnesium include, but are not limited to, magnesium oxide or other materials having low water solubility that, when fired, convert to MgO, such as Mg(OH)$_2$, MgCO$_3$, and combinations thereof. For example, the source of magnesium may be talc ($Mg_3Si_4O_{10}(OH)_2$), including calcined and/or uncalcined talc, and coarse and/or fine talc.

Sources of alumina include, but are not limited to, powders that, when heated to a sufficiently high temperature in the absence of other raw materials, will yield substantially pure aluminum oxide. Examples of suitable alumina sources may include alpha-alumina, a transition alumina such as gamma-alumina or rho-alumina, hydrated alumina or aluminum trihydrate, gibbsite, corundum ($Al_2O_3$), boehmite (AlO(OH)), pseudoboehmite, aluminum hydroxide ($Al(OH)_3$), aluminum oxyhydroxide, and mixtures thereof.

Silica may be present in its pure chemical state, such as α-quartz or fused silica. Sources of silica may include, but are not limited to, non-crystalline silica, such as fused silica or sol-gel silica, silicone resin, low-alumina substantially alkali-free zeolite, diatomaceous silica, kaolin, and crystalline silica, such as quartz or cristobalite. Additionally, the sources of silica may further include, but are not limited to, silica-forming sources that comprise a compound that forms free silica when heated. For example, silicic acid or a silicon organometallic compound may form free silica when heated.

Hydrated clays used in cordierite-forming raw materials can include, by way of example and not limitation, kaolinite ($Al_2(Si_2O_5)(OH)_4$), halloysite ($Al_2(Si_2O_5)(OH)_4 \cdot H_2O$), pyrophyllite ($Al_2(Si_2O_5)(OH)_2$), combinations or mixtures thereof, and the like.

Aluminum titanate-forming raw materials may include, for example, an alumina source, a magnesia source, and a titania source. The titania source can in one respect be a titanium dioxide composition, such as rutile titania, anatase titania, or a combination thereof. The alumina source and magnesia source may be selected from the sources of alumina and magnesia described hereinabove. Exemplary non-limiting inorganic batch component mixtures suitable for forming aluminum titanate include those disclosed in U.S. Pat. Nos. 4,483,944; 4,855,265; 5,290,739; 6,620,751; 6,942,713; 6,849,181; 7,001,861; and 7,294,164, each of which is hereby incorporated by reference.

Silicon carbide-forming raw materials may include, for example, finely powdered silicon metal, a carbon precursor, and powdered silicon-containing fillers. The carbon precursor may be, for example, a water soluble crosslinking thermoset resin having a viscosity of less than about 1000 centipoise (cp). The thermoset resin utilized may be a high carbon yield resin in an amount such that the resultant carbon to silicon ratio in the batch mixture is about 12:28 by weight, the stoichiometric ratio of Si—C needed for formation of silicon carbide. Suitable silicon-containing fillers include silicon carbide, silicon nitride, mullite or other refractory materials. Exemplary non-limiting inorganic batch component mixtures suitable for forming silicon carbide include those disclosed in U.S. Pat. Nos. 6,555,031 and 6,699,429, each of which is hereby incorporated by reference.

Aluminum oxide-forming raw materials may include $Al_2O_3$ and/or aluminum oxide-forming ingredients.

In addition to the ceramic-forming raw materials which are inorganic, the ceramic batch mixture 101 may include organic materials that may include lubricants, surfactants, binders, and/or one or more pore-forming materials. The term "organic materials," as used herein, excludes the amount of solvents, such as water, included in various batch compositions. The organic materials can be used to form a flowable dispersion that has a relatively high loading of the ceramic material. The lubricants and surfactants are chemically compatible with the inorganic components, and provide sufficient strength and stiffness to allow handling of the green body. In embodiments, the ceramic batch mixture 101 may have organic materials in percent by weight of the inorganic components, by super addition, from about 1% to about 60% or even from about 2% to about 20%. In some embodiments, the ceramic batch mixture 101 may have organic materials in percent by weight of the inorganic components, by super addition, from about 5% to about 15%, from about 7% to about 12%, or even from about 9% to about 10%. In some embodiments, the ceramic batch mixture 101 may have organic materials in percent by weight of the inorganic components, by super addition, from about 5% to about 11%, or about 7%.

The organic materials, in some embodiments, may include a binder, and may include one or more pore-forming material. For example, the organic binder may be present in the batch mixture as a super addition in an amount in the range of from 0.1% to about 10.0% by weight of the inorganic ceramic batch ingredients. Binders may include, but are not limited to, cellulose-containing components such as methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, and mixtures thereof. Methylcellulose and/or methylcellulose derivatives, such as hydroxypropyl methylcellulose, are especially suited as organic binders.

Pore formers are preferably fugitive particulate material which is vaporized by combustion during drying and/or heating of the green body leaving behind a larger porosity than would otherwise be obtained. Pore-forming materials can include, for example, carbon (e.g., graphite, activated carbon, petroleum coke, and carbon black), starch (e.g., corn, barley, bean, potato, rice, tapioca, pea, sago palm, wheat, canna, and walnut shell flour), polymers (e.g., polybutylene, polymethylpentene, polyethylene, polypropylene, polystyrene, polyamides (nylons), epoxies, ABS, acrylics, and polyesters (PET)), hydrogen peroxides, and/or resins, such as phenol resin. One or more pore-forming materials may be employed. For example, a combination of a polymer and a starch may be used for pore forming. In some embodiments, the ceramic batch mixture may comprise from about 10% to about 60% by weight of an organic pore former. The organic pore formers may have a median particle size $d_{50}$ less than or equal to 20 microns. In some embodiments, the organic pore formers have a median particle size $d_{50}$ less than or equal to 15 microns or even a median particle size $d_{50}$ less than or equal to 10 microns.

A lubricant can provide fluidity to the ceramic precursor batch mixture and can aid in shaping the batch mixture into a green body by allowing the batch to remain sufficiently stiff during the forming (i.e., the extruding) process. The lubricant can include, for example, mineral oils distilled from petroleum, synthetic and semi-synthetic base oils, including Group II and Group III paraffinic base oils, polyalphaolefins, alphaolefins, and the like. In various embodiments, the lubricant is present in an amount of 0-7 wt % of the inorganic components, by super addition.

Organic surfactants may be provided to adsorb to the inorganic particles, keep the inorganic particles in suspension, and prevent clumping of the inorganic particles. The organic surfactant can include, for example, $C_8$-$C_{22}$ fatty acids and/or their ester or alcohol derivatives, such as stearic, lauric, linoleic, oleic, myristic, palmitic, and palmitoleic acids, soy lecithin, and mixtures thereof. For example, the organic surfactant may be present in an amount of at least 0.3 wt % of the inorganic components, by super addition.

In various embodiments, solvents may be added to the batch mixture to create a ceramic paste (precursor or otherwise) from which the green body is formed. In embodiments, the solvents may include aqueous-based solvents, such as water or water-miscible solvents. In some embodiments, the solvent is water. The amount of aqueous solvent present in the ceramic precursor batch may range from about 20 wt % to about 50 wt %.

Organic materials may be added to at least one inorganic component and mixed to form the ceramic, or ceramic-forming, batch mixture. By way of example, the inorganic components may be combined as powdered materials and intimately mixed to form a substantially homogeneous batch.

The batch mixture can be shaped or formed into a green body structure using forming means, such as molding, pressing, casting, extrusion, and the like. For example, the batch mixture can be extruded using an extruder to form a green body. The extruder may be a hydraulic ram extrusion press, a two stage de-airing single auger extruder, or a twin screw mixer with a die assembly attached to the discharge end of the extruder, depending on the particular embodiment. The batch mixture may be extruded at a predetermined temperature and velocity.

Preferably, the batch mixture is formed into a honeycomb structure. The honeycomb structure preferably comprises a web structure defining a plurality of cells separated by cell walls. However, the green body may be in a form other than a honeycomb structure.

After at least some of the organic materials are volatilized and removed from the green body, the green body is subsequently transferred to a kiln, where it is fired at a selected temperature under suitable atmosphere and for a time dependent upon the composition, size, and geometry of the green body to result in a fired, porous ceramic article such as a porous ceramic honeycomb structure. The kiln may be, by way of example and not limitation, a tunnel kiln, a periodic kiln, a fuel or direct fired kiln, an electric kiln, or a microwave-assisted kiln.

Firing times and temperatures depend on factors such as the composition and amount of material in the green body and the type of equipment used to fire the green body. During firing, temperatures in the firing process atmosphere may be increased at a rate greater than about 50° C./hr.

The heating rate may be greater than or equal to about 50° C. per hour (° C./hr.). For example, in some embodiments, the heating rate may be from about 50° C./hr. to about 200° C./hr., from about 60° C./hr. to about 130° C./hr., or from about 75° C./hr. to about 125° C./hr. In various embodiments, the heating rate may be less than or equal to about 200° C./hr., less than or equal to about 130° C./hr., less than or equal to about 125° C./hr., or even less than or equal to about 80° C./hr. In some embodiments, the heating rate may be about 75° C./hr., about 100° C./hr., or even about 125° C./hr. The heating rate may be limited to 200° C./hr. or less in some embodiments. In embodiments, the particular heating rate employed may depend at least in part on the size of the green body, the constituents within the ceramic batch mixture used to form the green body, and the shape of the green body.

In a first aspect, a ceramic material is disclosed herein comprising: a first crystalline phase comprised of a first refractory material, the first crystalline phase having a first melting point; and a second crystalline phase comprised of a second refractory material having a second melting point which is lower than the first melting point, wherein the second crystalline phase comprises domain sizes of greater than 5,000 $\mu m^2$ as measured by Electron Backscattered Diffraction (EBSD). In some embodiments, the first crystalline phase constitutes at least 50% by volume of the material. In some embodiments, the second crystalline phase constitutes less than 50% by volume of the material. In some embodiments, the first crystalline phase constitutes at least 50% by volume of the material, and the second crystalline phase constitutes less than 50% by volume of the material. In some embodiments, the first crystalline phase constitutes at least 50% by weight of the material. In some embodiments, the second crystalline phase constitutes less than 35% by weight of the material. In some embodiments, the first crystalline phase constitutes at least 55% by weight of the material, and the second crystalline phase constitutes less than 35% by weight of the material. In some embodiments, the first crystalline phase constitutes at least 60% by weight of the material, and the second crystalline phase constitutes less than 30% by weight of the material. In some embodiments, the melting point of the first crystalline phase is greater than 1500° C. In some embodiments, the melting point of the second crystalline phase is less than 1500° C. In some embodiments, the melting point of the second crystalline phase is 1450° C. or less; in some of these embodiments, the melting point of the second crystalline phase is 1300° C. to 1450° C.; in some of these embodiments, the melting point of the second crystalline phase is 1425° C. to 1450° C. In some embodiments, the melting point of the first crystalline phase is greater than 1500° C. and the melting point of the second crystalline phase is less than 1500° C.

In some embodiments, the second crystalline phase comprises domain sizes of greater than 10,000 $\mu m^2$ as measured by Electron Backscattered Diffraction (EBSD), in some embodiments greater than 15,000 $\mu m^2$, in some embodiments.

greater than 20,000 $\mu m^2$, in some embodiments greater than 25,000 $\mu m^2$ as measured by Electron Backscattered Diffraction (EBSD), and in some embodiments greater than 30,000 $\mu m^2$ as measured by Electron Backscattered Diffraction (EBSD).

In some embodiments, the second crystalline phase has an average domain size of greater than 3,000 $\mu m^2$ as measured by Electron Backscattered Diffraction (EBSD), in some embodiments greater than 4,000 $\mu m^2$, in some embodiments greater than 5,000 $\mu m^2$, in some embodiments greater than 6,000 $\mu m^2$, in some embodiments greater than 7,000 $\mu m^2$, in some embodiments greater than 10,000 $\mu m^2$, in some embodiments greater than 15,000 $\mu m^2$, in some embodiments greater than 20,000 $\mu m^2$ as measured by Electron Backscattered Diffraction (EBSD).

In some embodiments, the first crystalline phase comprises tialite. In some embodiments, the first crystalline phase comprises predominantly tialite. In some embodiments, the first crystalline phase comprises a plurality of refractory materials in solid solution with one another. In some embodiments, the first crystalline phase comprises MgTi2O5 in solid solution with tialite. In some embodiments, the first crystalline phase comprises mullite.

In some embodiments, the ceramic material further comprises a third crystalline phase. In some embodiments, the first crystalline phase comprises mullite and the second crystalline phase comprises cordierite. In some embodiments, the first crystalline phase comprises mullite, the second crystalline phase comprises cordierite, and the third crystalline phase comprises tialite. In some embodiments, the first crystalline phase comprises mullite, the second crystalline phase comprises cordierite, and the third crystalline phase comprises tialite and MgTi2O5. In some embodiments, the third crystalline phase comprises mullite. In some embodiments, the first crystalline phase comprises tialite and the second crystalline phase comprises cordierite. In some embodiments, the first crystalline phase comprises tialite, the second crystalline phase comprises cordierite, and the third crystalline phase comprises mullite. In some embodiments, the first crystalline phase comprises tialite and MgTi2O5; in some of these embodiments, the first crystalline phase comprises tialite and MgTi2O5 in solid solution with one another.

In some embodiments, the second crystalline phase comprises cordierite. In some embodiments, the second crystalline phase comprises predominantly cordierite. In some embodiments, the second crystalline phase consists essentially of cordierite. In some embodiments, the second crystalline phase is cordierite.

In some embodiments, the first crystalline phase comprises a predominant pseudobrookite crystal structure.

In some embodiments, at least a majority of the first crystalline phase provides a multi-branched solid network, and at least some of the second crystalline phase is disposed directly adjacent one or more branches of the solid network.

In some embodiments, a ratio of a maximum domain size of the second crystalline phase to a maximum domain size of the first crystalline phase is 6.0 or more, in some embodiments 7.0 or more, in some embodiments 8.0 or more, in some embodiments 10.0 or more, in some embodiments 15 or more, in some embodiments 20 or more.

In some embodiments, the domains of the second crystalline phase sizes that are greater than 10,000 $\mu m^2$ directly contact grains of the first crystalline phase. In some embodiments, the domains of the second crystalline phase sizes that are greater than 10,000 $\mu m^2$ at least partially surround grains of the first crystalline phase.

In some embodiments, the first crystalline phase further comprises one or more rare earth oxides.

In some embodiments, the ceramic material comprises a bulk porosity of greater than 40% as measured by mercury porosimetry.

In some embodiments, the ceramic material comprises a plurality of pores having a pore size distribution with a d10 of 10 $\mu m$ or greater.

In some embodiments, the ceramic material comprises a plurality of pores having a pore size distribution with a d50 of 15 $\mu m$ or greater.

In some embodiments, the ceramic material comprises a plurality of pores having a pore size distribution with a d50 of 15 to 20 $\mu m$.

In some embodiments, a ceramic structure is disclosed herein comprised of the above ceramic material(s). In some embodiments, a ceramic structure is disclosed herein comprised of at least one wall comprised of the above ceramic material(s). In some embodiments, a ceramic honeycomb structure is disclosed herein comprised of a matrix of intersecting walls comprised of the above ceramic material(s); in some of these embodiments, a catalytic washcoat material disposed on at least one of the walls of the honeycomb structure. In some embodiments, a filter is disclosed herein comprising a honeycomb structure comprised of the above ceramic material(s); in some of these embodiments, the filter further comprises a plurality of plugs disposed in a plurality of cells of the honeycomb structure.

In a second aspect, a ceramic material is disclosed herein comprising: a first crystalline phase comprised of a first refractory material, the first crystalline phase having a first melting point; and a second crystalline phase comprised of a second refractory material having a second melting point which is lower than the first melting point, wherein the second crystalline phase has an average domain size of greater than 2,500 $\mu m^2$ as measured by Electron Backscattered Diffraction (EBSD). In some embodiments, the second crystalline phase has an average domain size of greater than 3,000 $\mu m^2$ as measured by Electron Backscattered Diffraction (EBSD), in some embodiments greater than 5,000 $\mu m^2$, in some embodiments greater than 10,000 $\mu m^2$, in some embodiments greater than 15,000 $\mu m^2$, and in some embodiments greater than 20,000 $\mu m^2$.

In some embodiments, the first crystalline phase comprises tialite. In some embodiments, the first crystalline phase further comprises MgTi2O5. In some embodiments, the second crystalline phase comprises cordierite. In some embodiments, the ceramic material further comprises a third crystalline phase comprising a third refractory material. In some embodiments, the third crystalline phase comprises mullite.

In a third aspect, a ceramic material is disclosed herein comprising: a first crystalline phase comprised of a first refractory material, the first crystalline phase having a first melting point; and a second crystalline phase comprised of a second refractory material having a second melting point which is lower than the first melting point, wherein the second crystalline phase comprises domain sizes of greater than 4,000 $\mu m^2$ an average domain size of greater than 2,500 $\mu m^2$ as measured by Electron Backscattered Diffraction (EBSD). In some embodiments, the first crystalline phase comprises tialite. In some embodiments, the first crystalline phase further comprises MgTi2O5. In some embodiments, the second crystalline phase comprises cordierite. In some embodiments, the ceramic material further comprises a third crystalline phase comprising mullite.

In a fourth aspect, a composite ceramic material is disclosed herein comprising: a first crystalline phase comprised of tialite, the first crystalline phase having a first melting point and a first maximum domain size in a select cross-sectional plane; and a second crystalline phase comprised of cordierite having a second melting point which is lower than the first melting point, and having a second maximum domain size in the select cross-sectional plane, wherein a ratio of the second maximum domain size to the first maximum domain size is 6.0 or more. In some embodiments, the ratio of the second maximum domain size to the first maximum domain size is 7.0 or more, in some embodiments 8.0 or more, in some embodiments 10.0 or more, in some embodiments 15 or more, and in some embodiments 20 or more.

In some embodiments, the second crystalline phase has domain sizes of greater than 5,000 $\mu m^2$ as measured by Electron Backscattered Diffraction (EBSD).

In some embodiments, the first crystalline phase constitutes at least 50% by volume of the material. In some embodiments, the second crystalline phase constitutes less than 50% by volume of the material. In some embodiments, the first crystalline phase constitutes at least 50% by volume of the material, and the second crystalline phase constitutes less than 50% by volume of the material.

In some embodiments, the first crystalline phase comprises predominantly tialite. In some embodiments, the first crystalline phase comprises a plurality of refractory materials in solid solution with one another. In some embodiments, the first crystalline phase comprises MgTi2O5 in solid solution with tialite.

In some embodiments, the ceramic material further comprises a third crystalline phase. In some embodiments, the third crystalline phase comprises mullite. In some embodiments, the first crystalline phase comprises tialite, the second crystalline phase comprises cordierite, and the third crystalline phase comprises mullite. In some embodiments, the first crystalline phase comprises tialite and MgTi2O5, and in some of these embodiments, the first crystalline phase comprises tialite and MgTi2O5 in solid solution with one another.

In some embodiments, the second crystalline phase comprises predominantly cordierite. In some embodiments, second crystalline phase consists essentially of cordierite. In some embodiments, the second crystalline phase is cordierite.

In some embodiments, the first crystalline phase comprises a predominant pseudobrookite crystal structure.

In a fifth aspect, a method of manufacturing an article comprised of composite ceramic material is disclosed herein, the method comprising: heating a body comprised of an initial mixture comprising a first refractory material or its precursors, or both, and a second refractory material or its precursors, or both, which if first refractory material precursors are present the heating is sufficient to cause reactive formation of first refractory material from at least some of its precursors, and which if second refractory material precursors are present is sufficient to cause reactive formation of second refractory material from at least some of its precursors, and the heating is sufficient to cause at least some of the first refractory material to melt and to contact at least some of the second refractory material without causing the second refractory material to melt during the heating, and then cooling the body such that a composite ceramic material is formed, the composite ceramic material comprising a first crystalline phase comprised of the first refractory material, and a second crystalline phase comprised of the second refractory material, wherein the second crystalline phase comprises domain sizes of greater than 5,000 µm$^2$ as measured by Electron Backscattered Diffraction (EBSD).

In some embodiments, not all of the second refractory material present during the heating is melted during the heating. In some of these embodiments, non-melted second refractory material provides nucleation sites for epitaxial domain growth of the second crystalline phase.

In some embodiments, at least 10% of the second refractory material present during the heating is melted during the heating, in some embodiments at least 20%, in some embodiments at least 50%, in some embodiments at least 90%, and in some embodiments all of the second refractory material present during the heating is melted during the heating.

In some embodiments, the mixture further comprises one or more pore forming materials; in some of these embodiments, the heating causes the one or more pore forming materials to burn out of the mixture such that the ceramic material is imparted with an average bulk porosity. In some embodiments, the average bulk porosity is 40% or greater.

In some embodiments, the first crystalline phase has a first melting point, and the second crystalline phase has a second melting point which is lower than the first melting point.

In some embodiments, the top temperature reached by the mixture during the heating is less than the first melting point. In some embodiments, the top temperature reached by the mixture during the heating is 1300° C. to 1450° C.

In some embodiments, the first crystalline phase comprises tialite. In some embodiments, the first crystalline phase comprises predominantly tialite. In some embodiments, the first crystalline phase comprises a plurality of refractory materials in solid solution with one another. In some embodiments, the first crystalline phase comprises MgTi2O5 in solid solution with tialite.

In some embodiments, the composite ceramic material further comprises a third crystalline phase. In some embodiments, the third crystalline phase comprises a third refractory material. In some embodiments, the third crystalline phase comprises mullite. In some embodiments, the first crystalline phase comprises tialite and MgTi2O5. In some embodiments, the first crystalline phase comprises tialite, MgTi2O5, and mullite in solid solution with one another.

In some embodiments, the second crystalline phase comprises cordierite. In some embodiments, the second crystalline phase comprises predominantly cordierite. In some embodiments, the second crystalline phase consists essentially of cordierite. In some embodiments, the second crystalline phase is cordierite.

In some embodiments, cordierite precursors are present in the initial mixture. In some embodiments, the initial mixture is substantially free of cordierite.

In some embodiments, the first crystalline phase comprises a predominant pseudobrookite crystal structure. In some embodiments, at least a majority of the first crystalline phase provides a multi-branched solid network, and at least some of the second crystalline phase is disposed directly adjacent one or more branches of the solid network.

In some embodiments, the cooling comprises causing the body to cool at a rate of 80 C/hr or less, in some embodiments 50 C/hr or less, in some embodiments 40 C/hr or less, in some embodiments 20 C/hr or less.

In some embodiments, the cooling comprises causing the body to cool at a rate of 80 C/hr or less when at least part of the body has a temperature of greater than 1200 C. In some embodiments, the cooling comprises causing the body to cool at a rate of 80 C/hr or less when at least part of the body has a temperature of greater than 1100 C. In some embodiments, the cooling comprises causing the body to cool at a rate of 80 C/hr or less when at least part of the body has a temperature of greater than 1000 C.

EXAMPLE

The various embodiments described hereinabove will be further clarified by the following examples.

Figure 1:
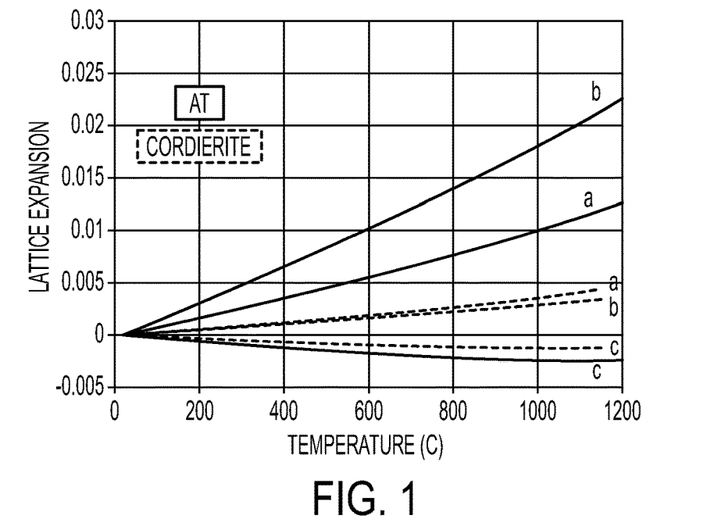
FIG. 1 is a schematic plot of lattice expansion versus temperature for aluminum titanate and cordierite.

Now turning to ceramic materials comprising a high percentage of aluminum titanate (AT), materials or bodies disclosed herein can comprise aluminum titanate (stabilized aluminum titanate such as aluminum titanate stabilized by magnesium titanate), and cordierite, where the cordierite has very large domain structures. In these bodies, the coefficient of thermal expansion (CTE) can be lower than in bodies comprised of similar constituents but with smaller domain structures. The low CTE of such composite ceramic materials disclosed herein are dependent on both the cordierite phase and the AT phase for their low CTE. Lowered CTE can help to open the operating window for such material. Both AT and cordierite phases have anisotropic thermal parameters. For example FIG. 1 displays the lattice expansion for both AT and cordierite. Both phases have one axis that displays negative expansion on heating. Controlling the orientation of these phases in the honeycomb body is one way to achieve thermal properties of the material. The anisotropy of the lattice expansion can also be a source of internal micro-stress and microcracking at the grain level which can also be obtained to achieve favorable thermal expansion properties of materials. In various applications such as in raised temperature environments such as in engine exhaust streams where temperatures can vary by hundreds of degrees C., lower CTE materials can typically survive better during use. In various applications, the lower the CTE, the better the performance of the material.

Figure 2:
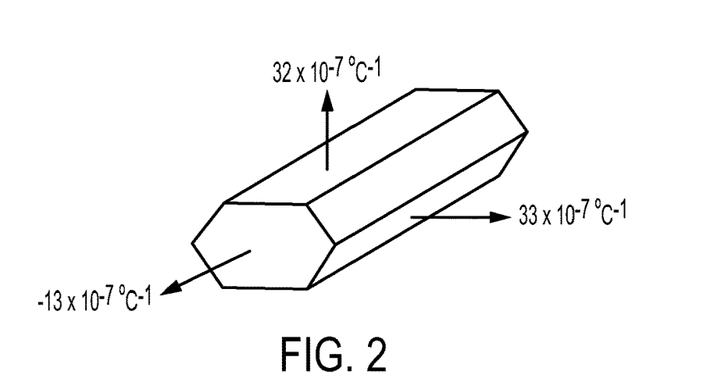
FIG. 2 is a schematic illustration of an orthorhombic structure of a cordierite crystal and the associated expansions of each axis.

FIG. 2 shows a schematic illustration of an orthorhombic structure of a cordierite crystal and the associated expansions of each axis.

Figure 3:
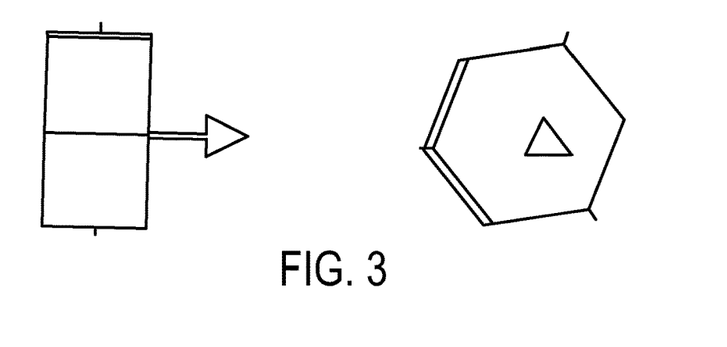
FIG. 3 schematically illustrates an orthorhombic structure of a cordierite crystal.

FIG. 3 schematically illustrates an orthorhombic structure of a cordierite crystal. The figure on the left shows the crystal orientation, where the cordierite negative expansion c-axis is oriented within the plane of the picture. The figure on the right shows the crystal orientation where the cordierite negative expansion c-axis is oriented perpendicular to the plane of the picture. The c-axis in cordierite is parallel to the length of the prismatic crystal. The a and b axis are at right angles to the c-axis and to one another.

In some embodiments disclosed herein, particulate filters or catalyst substrates can be comprised of ceramic bodies such as honeycomb structures comprising one or more ceramic materials comprising a plurality, or several, different crystalline phases or materials, for example: aluminum titanate with or without magnesium titanate, and feldspar or cordierite and other smaller quantity phases. In various embodiments the predominant crystal structure of AT is called pseudobrookite.

The specific crystalline material of aluminum titanate is called tialite. Pure tialite is not thermodynamically stable below about 1200° C. In order to prevent the decomposition of AT during use at elevated temperatures, the AT can be stabilized in some embodiments with, for example, $MgTi_2O_5$, which can form a solid solution with $Al_2TiO_5$ and which can also be found in the pseudobrookite crystal structure. In these embodiments, it was found that cordierite is a highly advantageous secondary phase to achieve desired physical properties such as low CTE, high porosity, and/or high strength needed for, for example, particulate filter applications. We have found that the cordierite has a surprisingly large impact on the physical properties of the material. It has been found that in these AT embodiments the lowest CTE material can be achieved through creating very large domain structures in cordierite. These domain structures, in their largest forms, may be limited only by macroscopic physical boundaries are limitations such as the width of the webs in a honeycomb structure. We have also found that these cordierite domains have the surprising attribute of being wrapped around or wrapping around the pseudobrookite materials, and that the cordierite domains appear as non-contiguous in 2D space, but are in fact contiguous in 3D space. Thus, in these embodiments, an aluminum titanate containing material (with or without magnesium or iron titanate) is provided that also contains cordierite, where the cordierite is found with large domain structures (or "large domains"). These domain structures can be measured using Electron Backscattered Diffraction (EBSD). The method of measurement includes vacuum impregnation of the porous ceramic honeycomb into epoxy, curing the epoxy, then polishing to a high quality finish either parallel (long section) or perpendicular (cross section) to the honeycomb extrusion direction. A thin metallic coating is applied to the polished section to minimize charging and EBSD is completed in a Field Emission Scanning Electron Microscope (FESEM). The electron backscattered diffraction pattern at each point in the micrograph can be compared to known crystal structure information determined from powder x-ray diffraction data to provide information on the crystal type and orientation with sub-micron spatial resolution. Post processing of the EBSD data allows for mapping regions of crystals with similar crystallographic orientation by creating a texture component plot with the color in the plot indicating the orientation of the negative expansion direction of the crystal of interest, either AT or cordierite, relative to the sample surface. Image analysis can then be used to determine the equivalent spherical diameter of regions with similar crystallographic orientation. As the regions are not continuous in 2-D space, direct measurement of the domain size is largely not possible with standard EBSD techniques.

In these AT/cordierite examples the major phase is pseudobrookite, which is relatively inert. In some embodiments, cordierite can be obtained from cordierite phase forming materials which can be heated to the melting point of cordierite, thus helping to nucleate and form large domains. Also, in some embodiments, as the major phase is the relatively inert pseudobrookite, the cordierite phase forming regions are separated thus reducing the nucleation regions, and leading to large domains.

In some embodiments, we found that if the duration of top soak during the firing cycle was shortened, for example for cost reduction reasons, the CTE of the fired article increased as compared to a longer top soak firing period; however if the top soak portion of the cycle was shortened, all else being the same, a lower CTE could once again be achieved by implementing a cooling portion of the firing cycle having a slower cooling rates. The "top soak" is the highest kiln temperature set point, or highest kiln temperature to which ware is exposed inside a kiln, for a specified time according to the firing schedule.

TABLE 1

| Batch Material Name | Example 1 | Example 2 | Example 3 Comparative | Example 4 Comparative | Example 5 Comparative | Example 6 Comparative |
|---|---|---|---|---|---|---|
| Tialite (78% Al2TiO5 and 22% MgTi2O5 | 75.00 | | | | | 75.00 |
| Alumina | 11.91 | 41.71 | 41.71 | 41.71 | 41.71 | 11.91 |
| Coarse Silica (~25 um D50) | 10.12 | 3.01 | 3.01 | 3.01 | 3.01 | |
| Fine Silica (<10 um D50) | | | | | | 10.12 |
| Mg(OH)2 | 2.97 | | | | | 2.97 |
| TiO2 | | 33.09 | 33.09 | 33.09 | 33.09 | |
| Talc | | 20.74 | 20.74 | 20.74 | 20.74 | |
| Ceria | | 1.46 | 1.46 | 1.46 | 1.46 | |
| Pea Starch | | 28.00 | 28.00 | 28.00 | 28.00 | |
| Graphite | 12.000 | 10.00 | 10.00 | 10.00 | 10.00 | 12.000 |
| Binder 1 | 6.000 | 1.50 | 1.50 | 1.50 | 1.50 | 6.000 |
| Binder 2 | | 3.00 | 3.00 | 3.00 | 3.00 | |

TABLE 1-continued

|  | Example 1 | Example 2 | Example 3 Comparative | Example 4 Comparative | Example 5 Comparative | Example 6 Comparative |
|---|---|---|---|---|---|---|
| Fatty Acid | 0.20 | 1.00 | 1.00 | 1.00 | 1.00 | 0.20 |
| Firing Cycle |  |  |  |  |  |  |
| 20° C. to 225° C. | 200° C./h | 200° C./h | 200° C./h | 200° C./h | 200° C./h | 200° C./h |
| 225-270° C. | 5° C./h | 5° C./h | 5° C./h | 5° C./h | 5° C./h | 5° C./h |
| 270° C. to 800° C. | 200° C./h | 200° C./h | 200° C./h | 200° C./h | 200° C./h | 200° C./h |
| 800° C. to 1000° C. | 20° C./h | 6° C./h | 6° C./h | 6° C./h | 6° C./h | 20° C./h |
| 1000° to top soak | 75° C./h | 75° C./h | 75° C./h | 75° C./h | 75° C./h | 75° C./h |
| top soak temp (° C.) & time (h) | 1375° C., 4 h | 1355° C., 16 h | 1355° C., 22 h | 1355° C., 22 h | 1355° C., 22 h | 1375° C., 4 h |
| Cooling to 1200° C. | 150° C./h | 40° C./h | 150° C./h | 150° C./h | 150° C./h | 150° C./h |
| Cooling to 20° C. | 150° C./h | 150° C./h | 150° C./h | 150° C./h | 150° C./h | 150° C./h |
| Domain Sizes (Ave of largest 10) |  |  |  |  |  |  |
| Cordierite | 21210 | 4836 | 2267 | 1079 | 1381 | 1639 |
| Tialite | 1075 | 616 | 452 | 531 | 661 | 1075 |
| Ratio of Cordierite to Tialite | 19.7 | 7.9 | 5.0 | 2.0 | 2.1 | 1.5 |

Example 1—Tialite with Large Cordierite Domains

A composite ceramic material comprised of tialite and large domain cordierite was prepared from materials found in Table 1, Example 1. The batch material was extruded, dried and then fired per conditions found in Table 1, Example 1. An image of a cross-section was analyzed from EBSD Data. Table 1 shows the representative areas of the top image objects corresponding to the largest cordierite domains. The average domain size of the top 10 also appears in Table 1.

Figure 4:
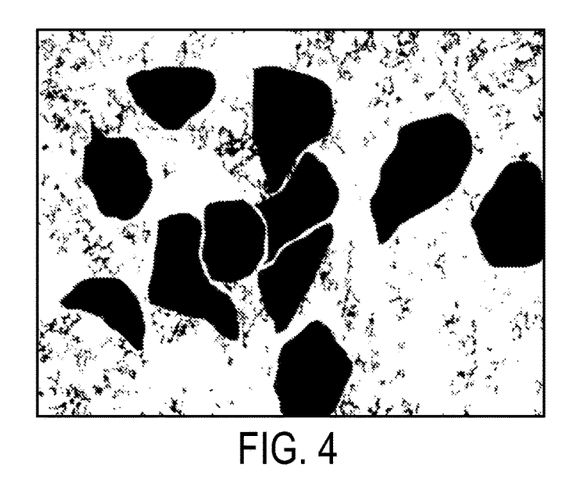
FIG. 4 shows regions/domains of similar Cordierite Orientation from image analysis of EBSD data corresponding to an exemplary embodiment.

FIG. 4 shows regions/domains of similar Cordierite Orientation from image analysis of EBSD data corresponding to Table 1.

Example 2—Tialite with Large Cordierite Domains from Slow Cool

A composite ceramic material comprised of tialite and large domain cordierite was prepared from materials found in Table 1, Example 2. The batch material was extruded, dried and then fired per conditions found in Table 1, Example 2. An image of a cross-section was analyzed from EBSD Data. Table 1 shows the representative areas of the top 10 image objects corresponding to the largest cordierite domains. The average domain size of the top 10 also appears in Table 1.

Figure 5:
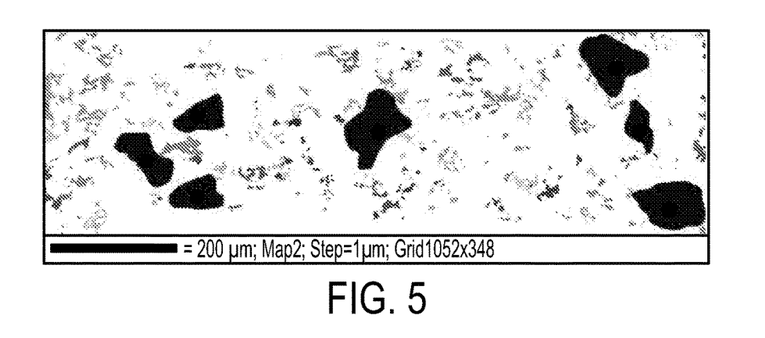
FIG. 5 shows regions/domains of similar Cordierite Orientation from image analysis of EBSD data corresponding to an exemplary embodiment.

FIG. 5 shows regions/domains of similar Cordierite Orientation from image analysis of EBSD data corresponding to Table 2.

Example 3—Comparative—Tialite with Cordierite Domains from Fast Cool

A composite ceramic material comprised of tialite and large domain cordierite was prepared from materials found in Table 1, Example 3. The batch material was extruded, dried and then fired per conditions found in Table 1, Example 3. An image of a cross-section was analyzed from EBSD Data. Table 1 shows the representative areas of the top 10 image objects corresponding to the largest cordierite domains. The average domain size of the top 10 also appears in Table 1.

Figure 6:
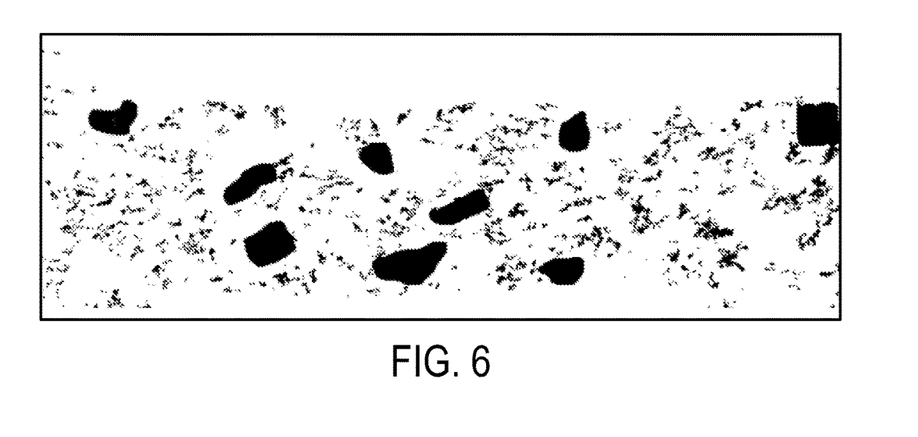
FIG. 6 shows regions/domains of similar Cordierite Orientation from image analysis of EBSD data corresponding to a comparative example.

FIG. 6 shows regions/domains of similar Cordierite Orientation from image analysis of EBSD data corresponding to Table 3.

Example 4—Comparative—Tialite with Cordierite Domains from Fast Cool

A composite ceramic material comprised of tialite and large domain cordierite was prepared from materials found in Table 1, Example 4. The batch material was extruded, dried and then fired per conditions found in Table 1, Example 4. An image of a cross-section was analyzed from EBSD Data. Table 1 shows the representative areas of the top 10 image objects corresponding to the largest cordierite domains. The average domain size of the top 10 also appears in Table 1.

Figure 7:
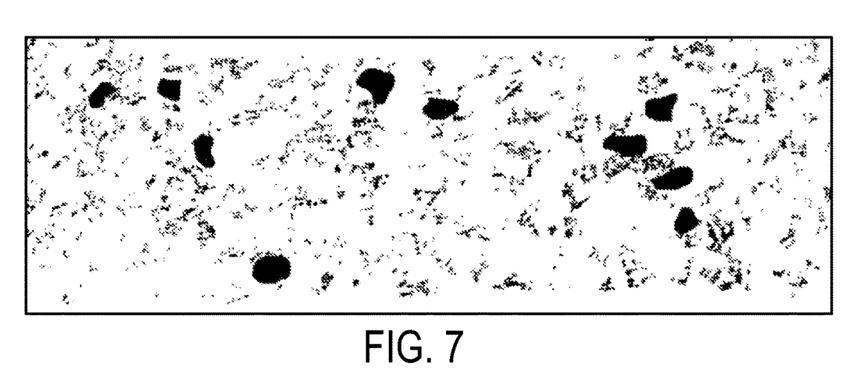
FIG. 7 shows regions/domains of similar Cordierite Orientation from image analysis of EBSD data corresponding to a comparative example.

FIG. 7 shows regions/domains of similar Cordierite Orientation from image analysis of EBSD data corresponding to Table 4.

Example 5—Comparative—Cordierite with Large Cordierite Domains from Fast Cool: Small Cordierite Domains A composite ceramic material comprised of tialite and large domain cordierite was prepared from materials found in Table 1, Example 5. The batch material was extruded, dried and then fired per conditions found in Table 1, Example 5. An image of a cross-section was analyzed from EBSD Data. Table 1 shows the representative areas of the top 10 image objects corresponding to the largest cordierite domains. The average domain size of the top 10 also appears in Table 1.

Figure 8:
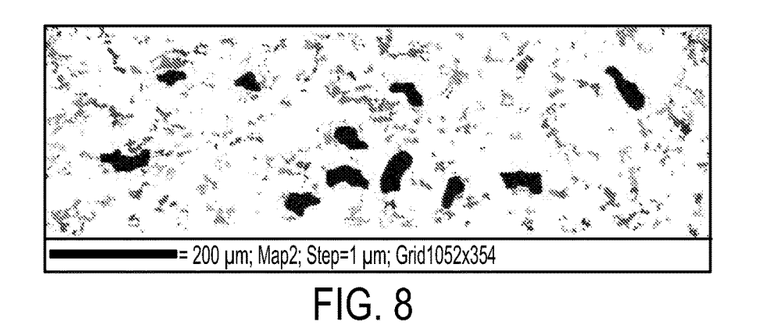
FIG. 8 shows regions/domains of similar Cordierite Orientation from image analysis of EBSD data corresponding to a comparative example.

FIG. 8 shows regions/domains of similar Cordierite Orientation from image analysis of EBSD data corresponding to Table 5.

Example 6—Comparative—Tialite with Cordierite Domains

A composite ceramic material comprised of tialite and large domain cordierite was prepared from materials found in Table 1, Example 6. The batch material was extruded, dried and then fired per conditions found in Table 1, Example 6. An image of a cross-section was analyzed from EBSD Data. Table 1 shows the representative areas of the top 10 image objects corresponding to the largest cordierite domains. The average domain size of the top 10 also appears in Table 1.

Figure 9:
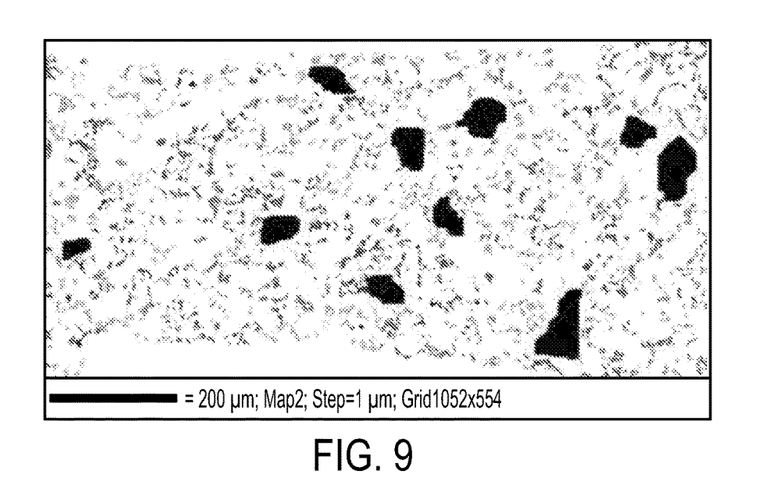
FIG. 9 shows regions/domains of similar Cordierite Orientation from image analysis of EBSD data corresponding to a comparative example.

FIG. 9 shows regions/domains of similar Cordierite Orientation from image analysis of EBSD data corresponding to Table 6.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A ceramic material comprising:
   a first crystalline phase comprised of a first refractory material, the first crystalline phase having a first melting point;
   a second crystalline phase comprised of a second refractory material having a second melting point which is lower than the first melting point, wherein the second crystalline phase comprises domain sizes of greater than 5,000 μm$^2$ as measured by Electron Backscattered Diffraction (EBSD);
   wherein the first crystalline phase comprises MgTi2O5 in solid solution with tialite.

2. The ceramic material of claim 1 wherein the first crystalline phase constitutes at least 50% by volume of the ceramic material.

3. The ceramic material of claim 1 wherein the second crystalline phase constitutes less than 50% by volume of the ceramic material.

4. The ceramic material of claim 1 wherein the first crystalline phase constitutes at least 50% by weight of the ceramic material.

5. The ceramic material of claim 1 wherein the second crystalline phase constitutes less than 35% by weight of the ceramic material.

6. The ceramic material of claim 1 wherein the first crystalline phase constitutes at least 55% by weight of the material, and the second crystalline phase constitutes less than 35% by weight of the ceramic material.

7. The ceramic material of claim 1 wherein the first crystalline phase constitutes at least 60% by weight of the material, and the second crystalline phase constitutes less than 30% by weight of the ceramic material.

8. The ceramic material of claim 1 wherein the melting point of the first crystalline phase is greater than 1500° C.

9. The ceramic material of claim 1 wherein the melting point of the second crystalline phase is less than 1500° C.

10. The ceramic material of claim 1 wherein the melting point of the second crystalline phase is 1450° C. or less.

11. The ceramic material of claim 1 wherein the melting point of the second crystalline phase is 1300° C. to 1450° C.

12. The ceramic material of claim 1 wherein the second crystalline phase comprises domain sizes of greater than 10,000 μm$^2$ as measured by Electron Backscattered Diffraction (EBSD).

13. The ceramic material of claim 1 wherein the second crystalline phase has an average domain size of greater than 20,000 μm$^2$ as measured by Electron Backscattered Diffraction (EBSD).

14. The ceramic material of claim 1 wherein the first crystalline phase further comprises mullite.

15. The ceramic material of claim 1 further comprising a third crystalline phase.

16. The ceramic material of claim 1 wherein the first crystalline phase further comprises mullite and the second crystalline phase comprises cordierite.

17. The ceramic material of claim 1, wherein the material comprises a bulk porosity of greater than 40% as measured by mercury porosimetry.

18. The ceramic material of claim 1, wherein the material comprises a plurality of pores having a pore size distribution with a d10 of 10 μm or greater.

19. The ceramic material of claim 1, wherein the material comprises a plurality of pores having a pore size distribution with a d50 of 15 μm or greater.

20. The ceramic material of claim 1, wherein the material comprises a plurality of pores having a pore size distribution with a d50 of 15 to 20 μm.

21. A composite ceramic material comprising:
    a first crystalline phase comprised of tialite in solid solution with MgTi2O5, the first crystalline phase having a first melting point and a first maximum domain size in a select cross-sectional plane;
    a second crystalline phase comprised of cordierite having a second melting point which is lower than the first melting point, and having a second maximum domain size in the select cross-sectional plane, wherein a ratio of the second maximum domain size to the first maximum domain size is 6.0 or more;
    wherein the second crystalline phase has domain sizes of greater than 5,000 μm$^2$ as measured by Electron Backscattered Diffraction (EBSD).

22. A ceramic material comprising:
    a first crystalline phase comprised of a first refractory material, the first crystalline phase having a first melting point;
    a second crystalline phase comprised of a second refractory material having a second melting point which is lower than the first melting point, wherein the second crystalline phase comprises domain sizes of greater than 5,000 μm$^2$ as measured by Electron Backscattered Diffraction (EBSD); and
    a third crystalline phase;
    wherein the first crystalline phase comprises mullite, the second crystalline phase comprises cordierite, and the third crystalline phase comprises tialite and MgTi2O5.

23. The ceramic material of claim 22 wherein the first crystalline phase constitutes at least 50% by volume of the ceramic material.

24. The ceramic material of claim 22 wherein the second crystalline phase constitutes less than 50% by volume of the ceramic material.

25. The ceramic material of claim 22 wherein the first crystalline phase constitutes at least 50% by weight of the ceramic material.

26. The ceramic material of claim 22 wherein the second crystalline phase constitutes less than 35% by weight of the ceramic material.

27. The ceramic material of claim 22 wherein the first crystalline phase constitutes at least 55% by weight of the material, and the second crystalline phase constitutes less than 35% by weight of the ceramic material.

28. The ceramic material of claim 22 wherein the first crystalline phase constitutes at least 60% by weight of the material, and the second crystalline phase constitutes less than 30% by weight of the ceramic material.

29. The ceramic material of claim 22 wherein the melting point of the first crystalline phase is greater than 1500° C.

30. The ceramic material of claim 22 wherein the melting point of the second crystalline phase is less than 1500° C.

31. The ceramic material of claim 22 wherein the melting point of the second crystalline phase is 1450° C. or less.

32. The ceramic material of claim 22 wherein the melting point of the second crystalline phase is 1300° C. to 1450° C.

33. The ceramic material of claim 22 wherein the second crystalline phase comprises domain sizes of greater than 10,000 μm² as measured by Electron Backscattered Diffraction (EBSD).

34. The ceramic material of claim 22 wherein the second crystalline phase has an average domain size of greater than 20,000 μm² as measured by Electron Backscattered Diffraction (EBSD).

35. The ceramic material of claim 22 wherein the material comprises a bulk porosity of greater than 40% as measured by mercury porosimetry.

36. The ceramic material of claim 22 wherein the material comprises a plurality of pores having a pore size distribution with a d10 of 10 μm or greater.

37. The ceramic material of claim 22 wherein the material comprises a plurality of pores having a pore size distribution with a d50 of 15 μm or greater.

38. The ceramic material of claim 22 wherein the material comprises a plurality of pores having a pore size distribution with a d50 of 15 to 20 μm.

* * * * *